United States Patent [19]

Takanashi

[11] 4,263,631
[45] Apr. 21, 1981

[54] OPERATING MECHANISMS OF TAPE RECORDERS

[75] Inventor: Hiroyoshi Takanashi, Hamamatsu, Japan

[73] Assignee: Nippon Gakki Seizo Kabushiki Kaisha, Shizuoka, Japan

[21] Appl. No.: 52,232

[22] Filed: Jun. 26, 1979

[30] Foreign Application Priority Data

Jun. 27, 1978 [JP] Japan .............................. 53/87447[U]
Jun. 27, 1978 [JP] Japan .............................. 53/87448[U]
Jun. 27, 1978 [JP] Japan .............................. 53/87449[U]

[51] Int. Cl.³ .......................... G11B 15/26; G11B 5/54
[52] U.S. Cl. .................................... 360/105; 242/204; 360/96.3; 360/137; 360/71
[58] Field of Search ...................... 360/105, 96.3, 96.1, 360/96.5, 137, 71, 74.1, 75; 242/197–201, 204, 75.4; 226/186, 187

[56] References Cited

U.S. PATENT DOCUMENTS

| | | | |
|---|---|---|---|
| 3,664,672 | 5/1972 | Fujikawa et al. | 360/105 |
| 3,821,800 | 6/1974 | Maltese | 360/105 |
| 3,838,459 | 9/1974 | Bettini | 360/105 |
| 3,881,187 | 4/1975 | Nakamichi | 360/96.3 |
| 4,071,865 | 1/1978 | Nakasuna | 360/137 |

*Primary Examiner*—Alfred H. Eddleman
*Attorney, Agent, or Firm*—Blakely, Sokoloff, Taylor & Zafman

[57] ABSTRACT

In an operating mechanism of a tape recorder wherein play, fast forward running and rewinding modes are switched by a pair of solenoids through an operating plate, the operating plate is rotated about a center of rotation when either one of the solenoids is energized but moved linearly when both solenoids are energized. There are also provided a head mechanism for moving a recording and reproducing head to a play position during play mode but separating the head from the play position during another modes, a spring for urging the head away from the play position, and a brake mechanism connected to the plunger of one solenoid to apply a braking force to the take-up and supply reel posts when both solenoids are not energized and to separate the brake mechanism from the take-up and supply reel posts when either one of the solenoid is energized.

10 Claims, 14 Drawing Figures

OPERATING MECHANISMS OF TAPE RECORDERS

BACKGROUND OF THE INVENTION

This invention relates to an operating mechanism of a tape recorder, and more particularly to an operating mechanism wherein a single electric motor is used as a drive source and two solenoids are used for effecting operating mode switching.

Purely mechanical means have been used for switching the operating modes of a tape recorder. With such mechanical means, however, operation of the operating buttons requires not only a large operating force but also a large operating stroke. Moreover, the construction is complicated, load of the motor is large and the life thereof is also short.

To obviate these difficulties a system has been developed in which an electric switch and a solenoid are used to control the operating mechanism. With this system, however, decrease in the number of motors, that is drive sources increases the number of solenoids whereas decrease in the number of solenoids increases the number of motors.

SUMMARY OF THE INVENTION

Accordingly, it is an object of this invention to provide an improved tape recorder operating mechanism eliminating the above-described difficulties of the known operating mechanisms.

It is another object of the invention to provide a tape recorder operating mechanism having a simple and inexpensive construction which can be operated with a light touch and has an excellent operation performance.

It is still another object of the invention to provide a tape recorder operating mechanism which incorporates a braking mechanism but requires only a small number of driving motors and solenoids.

According to this invention, there is provided an operating mechanism of a tape recorder of the type, wherein, according to play, fast forward running and rewinding modes, the operation of a motion transmitting mechanism including a fast running idler roller, a play back idler roller and a take-up idler roller is switched by an operating plate operatively connected with plungers of a pair of solenoids so as to selectively transmit driving torque of a driving motor to a take-up reel post and to a supply reel post through the motion transmitting mechanism, wherein there are provided means to rotate the operating plate about a center of rotation thereof according to the movement of the plunger of an energized one of the solenoids; means to linearly move the operating plate in accordance with the movements of the plungers of the solenoids when they are energized simultaneously; a head mechanism for moving a recording and reproducing head to a play position during the play mode whereas for moving the head away from the play position during another modes; a connecting member connected between the head mechanism and the center of rotation; spring means provided for the connecting member for normally urging the head away from the play position; a brake mechanism operatively connected to the plunger of one solenoid; and means for operating the brake mechanism to apply braking force to the take-up reel posts and to the supply reel post when both solenoids are not energized and to separate the brake mechanism from the take-up and supply reel posts when either one of the solenoids is energized.

DESCRIPTION OF THE PREFERRED EMBODIMENT

A preferred embodiment of the operating mechanism applied to a cassette tape recorder shown in FIGS. 1 through 6 comprises an operation switching mechanism mounted on both the front and rear surfaces of a U shaped chassis 2 and disposed to the rear of a cassette housing space 4 formed in the main body 3. A cassette 7 is inserted into the cassette housing space 4 through an opening 6 formed through a front panel 5. The lower end of a cover 8 is hinged to the main body of the apparatus so that the cover can move between a closed position shown by solid lines and open position shown by dot and dash lines. The cover 8 is provided with a transparent window 9. Between the chassis housing space 4 and the chassis 2 is disposed a sub-chassis 10 secured to the rear side of the front panel 5. The sub-chassis 10 is provided with three guide openings 14, 15 and 16 adapted to permit the fore ends of a supply reel post 11, a take-up reel post 12 and a capstan 13 to project into the cassette housing space 4 in a manner to be described later.

Figure 1:
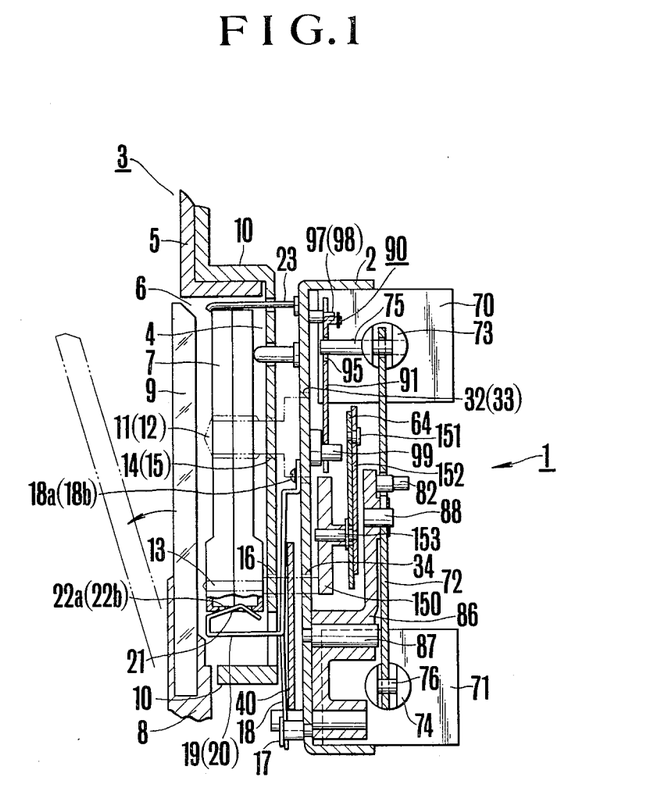
FIG. 1 is a longitudinal sectional view showing one example at the tape recorder operating mechanism embodying the invention.
Figure 2:
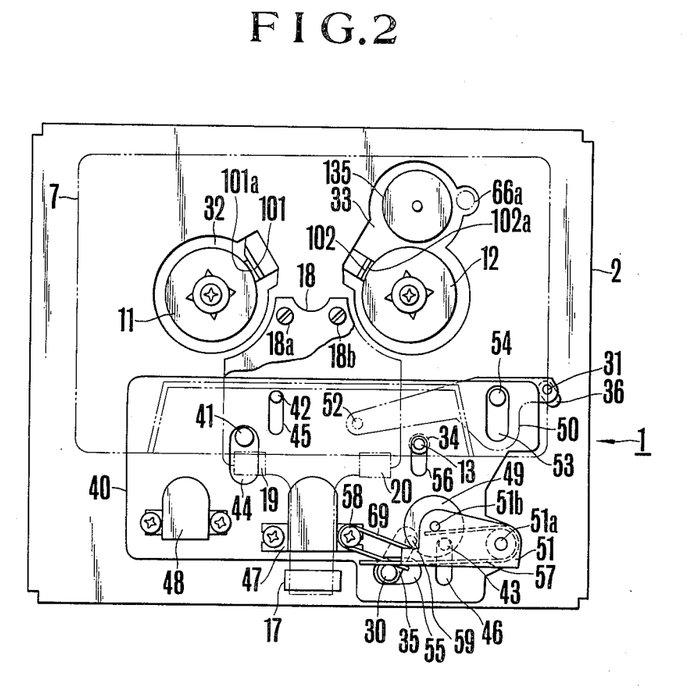
FIG. 2 is a front view showing the stop condition of the operation switching mechanism, with the main body of the apparatus removed.
Figure 2A:
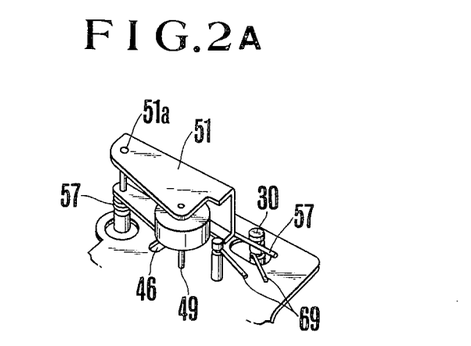
FIG. 2A is a detailed perspective view of a bracket supporting a pinch roller and associated parts.
Figure 3:
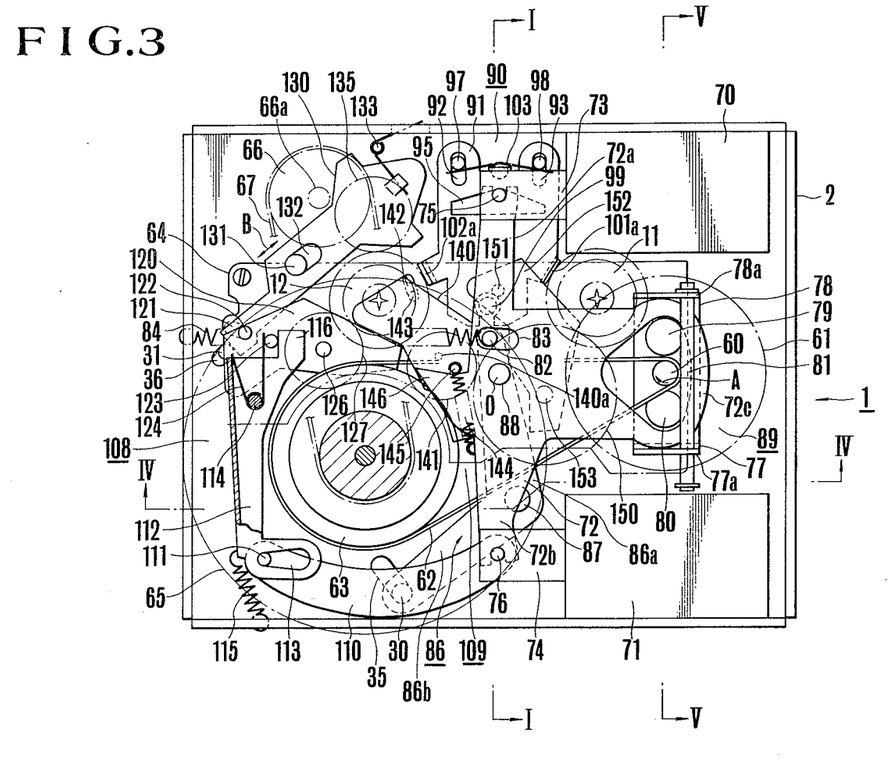
FIG. 3 is a rear view of the operation switching mechanism shown in FIG. 2.

A cassette clamping member 18 is secured to the central portion of the front surface of the chassis 2. The upper end of the clamping member 18 is secured by set screws 18a and 18b, while the lower end engages a catch 17 secured to the chassis 2. The cassette clamping member 18 is made of a metal plate and provided with a pair of hook shaped engaging members 19 and 20. These engaging members 19 and 20 project into the cassette housing space 4 and their bent portions 21 engage a pair of small windows 22a and 22b at the lower end of the cassette 7 to urge upwardly the same by their resiliency against a positioning member 23 projecting from the chassis 2 into the space 4. As shown in FIG. 2, chassis 2 is provided with guide openings 32-34 corresponding to the supply reel post 11, the take-up reel post 12 and the capstan 13 respectively, and oblique slots 35 and 36 for receiving operating pins 30 and 31 to be described later. The head base 40 supported by steel balls is disposed between the lower portion of the front surface of the chassis 2 and the clamping member 8. Thus, the cassette clamping member 18 also clamps the head base 40. As shown in FIG. 2, the head base 40 takes the form of a rectangular plate and is supported to be movable in the vertical direction by three pins 41–43 connected to the chassis and received in vertical slots 44–46. As will be described later, the head base 40 is normally pulled downwardly by a spring 84 so that it is normally held in the lower non-operative position shown in FIG. 2. A magnetic head 47 for recording and reproducing sounds is mounted on the front surface of the head base 40 at about the center of the lower portion thereof, an erasure magnetic head 48 is mounted at the left lower portion, a pinch roller 49 is at the right lower portion and a lever 50 is at the right upper portion. The pinch roller 49 is mounted on a bracket 51 through a pin 51b. The bracket 51 has a U shaped cross-section and one end thereof is connected to the head base 40 through a pin 51a. The bracket 51 is normally biased in the clockwise direction around the pin 51a by means of a spring 57. The rotation of the bracket 51 is limited by the engagement of the lefthand end of the bracket 51 against a pin 59 secured to the head base 40 so that the pinch roller 49 is normally separated from the capstan 13. When the head base 40 is moved upwardly to a playing position, a magnetic tape, not shown, would be clamped between capstans 13 and pinch roller 49. The head base 40 is also provided with a pin 52 which rotatably supports the left hand end of the lever 50. A slot 53 is provided at an intermediate portion of the lever 50 to receive a pin 54 secured to the head base 40. The operating pin 31 is secured to the right hand end of the lever to be received by the slot 36 of the chassis 2 and projects to the rear side of the chassis 2 as shown in FIG. 3. The operating pin 30 passing through the slot 35 of the chassis 2 is also received in a horizontal slot 55 at the lower portion of the head base 40 to arrest the same at the inoperative position. The operating pin 30 is normally urged downwardly by a hair pin spring 69 wound about a pin 58 connected to a set screw 58 provided for securing the recording and reproducing magnetic head 47, the other leg of the hair pin spring 69 engaging a pin 59 secured to the head base 40.

As shown in FIG. 3, an electric motor 61 is mounted on the rear surface of the chassis for rotating a driving shaft 60 in a direction shown by an arrow A. The rotation of the driving shaft 60 is transmitted to a flywheel pulley 63 integral with a flywheel 65 through a belt 62. The flywheel pulley 63 is supported by an auxiliary plate 64 (sub-chassis) disposed in parallel with the rear surface of the chassis 2 with a definite spacing therebetween. The end of a pin supporting the flywheel pulley 63 projects into the cassette housing space 4 through a guide opening 56 of the head base 40 to act as the capstan 13 shown in FIG. 2. The rotation of the flywheel pulley 63 is transmitted to an intermediate pulley 66 mounted on the rear side of the chassis 2 through a belt 67 (see FIG. 3).

Figure 5:
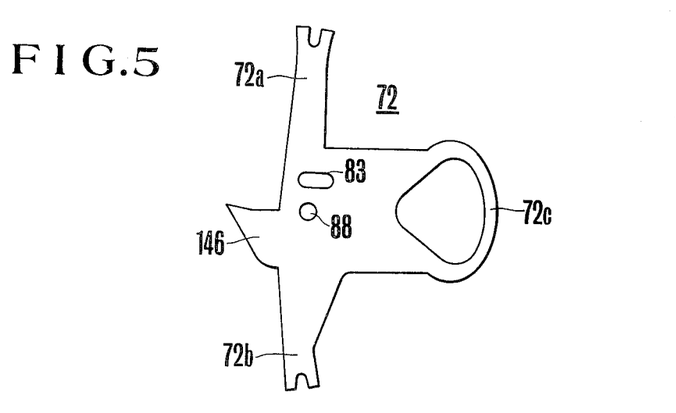
FIG. 5 is a plan view showing the configuration of an operating plate shown in FIG. 3.

As shown in FIG. 3, vertically spaced first and second electromagnetic solenoids 70 and 71 are mounted on the rear surface of the chassis 2. Actuation of either one or both of these solenoids by the control of a drive circuit shown in FIG. 8, moves to the right an operating plate 72 having a shape as shown in FIG. 5 or rotates it in the clockwise or counterclockwise direction thus constituting a drive unit for selectively the operating modes among switching play, fast forward running rewinding modes. To this end, the plungers 73 and 74 of the solenoids 70 and 71 are provided with pins 75 and 76 respectively which rotatably engage the ends of arms 72a and 72b of the operating plate 72. The right hand end 72c of the operating plate 72 is movably and swingably held by a holding mechanism 89 shown in FIGS. 3 and 6.

Figure 6:
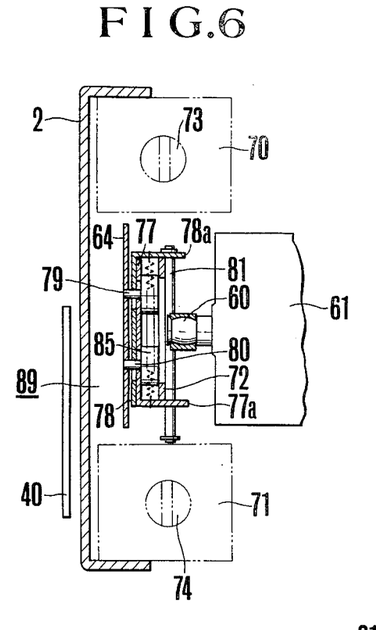
FIG. 6 is a sectional view taken along a line V—V shown in FIG. 3.

More particularly, the holding mechanism 89 comprises a pair of L shaped members 77 and 78 with their short legs 77a and 78a opposed in the vertical direction and their long legs superposed on each other. These L shaped members are slidably supported by stepped guide members 79 and 80 which are secured to the auxiliary plate 64 to extend through longitudinal slots of the L shaped members so that short legs 77a and 78a are caused to move toward and away each other. Furthermore the short legs 77a and 78a are biased to approach each other by a tension spring 85 connected therebetween. A guide rod 81 extends through aligned openings of the short legs 77a and 78a. The right hand end 72c of the operating plate 72 is inserted between the guide members 79 and 80 and the guide rod 81 to be slidable and swingable between the short legs 77a and 78a in a manner to be described hereunder.

As best shown in FIG. 5, the operating plate 72 has a center of rotation at a point of intersection O between the horizontal axis and a straight line interconnecting the pins 75 and 76 of the solenoids 70 and 71. The solenoids 70 and 71 are so designed that their plungers 73 and 74 can move freely in the plunging and returning directions when they are not energized. Normally, as the operating plate 72 is held in the inoperative position shown in FIG. 3 by the head base operating arm 56 interlocked with plate 72 and including a pin at its one end, the operating plate 72 is held at a position slightly to the right of the maximum projected position. The head base operating arm 86 is bent like a bow and its intermediate portion is rotatably secured to the chassis 2 through a pin 87. One leg 86a of the head base operating arm 86 is extending via a pin 88 connected to the center of rotation O of the operating plate 72 and a pin 82 is provided for the outer end of arm 86a, the pin 82 being received in a horizontal slot 83 formed above the center of rotation O of the operating plate 72. At the outer end of the other leg 86b of the head base operating arm 86 is secured the aforementioned operating pin 30 which engages the slots 35 and 55 of the chassis 2 and head base 40. The head base operating arm 86 is normally biased to rotate in the counterclockwise direction about pin 87 by a return spring 84 connected between the chassis 2 and the pin 82. Thus, the spring 84 urges the pin 30 downwardly so as to hold the head base 40 at the lower portion under inoperative condition.

Figure 7:
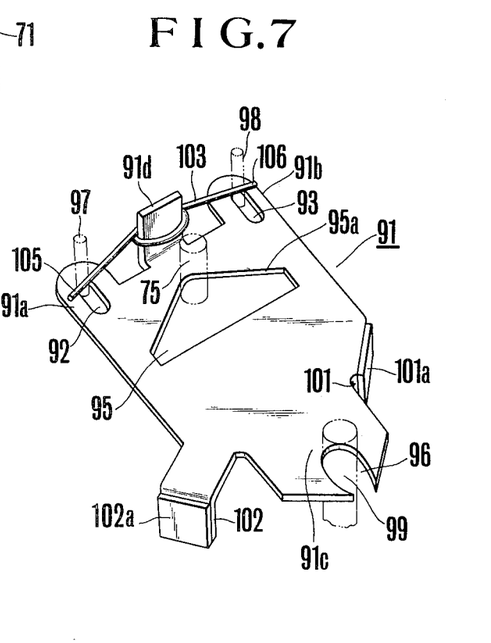
FIG. 7 is an enlarged perspective view of a brake plate shown in FIG. 3.

A brake plate 91 of a braking mechanism 90 is in engagement with the pin 75 of the plunger 73 so as to be movable in the vertical direction by being interlocked with the operating plate 72. The brake plate 91 has a configuration like a base plate of base ball game as shown in FIG. 7. Two projections 91a and 91b at the opposite ends of the upper side of the brake plate 91 are provided with slots 92 and 93 respectively, and the lower end of the brake plate 91 is provided with slot 96.

These slots 92, 93 and 96 loosely receive guide pins 97, 98 and 99 secured to the chassis 2 so that the brake plate 91 can be moved in only the vertical direction as viewed in FIG. 3. A pair of downwardly bent braking pieces 101 and 102 are formed on both side edges of the plate 91 near its bottom to be received in the guide openings 32 and 33 of the chassis 2, and braking pads 101a and 102a made of leather, rubber or felt are bonded to these braking pieces. The brake plate 91 is normally urged downwardly by the force of a spring 103 so as to urge the braking pieces 101 and 102 against the peripheries of the supply reel post 11 and take-up reel post 12 to prevent their rotation. The center portion of spring 103 is wound about the engaging member 91d of the brake plate 91 and its opposite ends are held by notches 105 and 106 provided for the guide pinces 97 and 98. At about the center of the brake plate 91 is formed an opening 95 having a triangular cam 95a and the lower end of pin 75 utilized to connect one arm 72a of the operating plate 72 to the plunger 73 of the first solenoid 70 is received in the opening 95. Normally, the pin 75 is spaced a little from the central portion of the cam 95a so that the braking pieces 101 and 102 equally engage with the supply reel post 11 and the take up reel post 12.

In this manner, as the braking mechanism is connected directly to the plunger of the solenoid the braking force is efficiently applied to the braking plate. Moreover, with this construction it is possible to apply equal braking force to both reel posts.

Figure 3A:
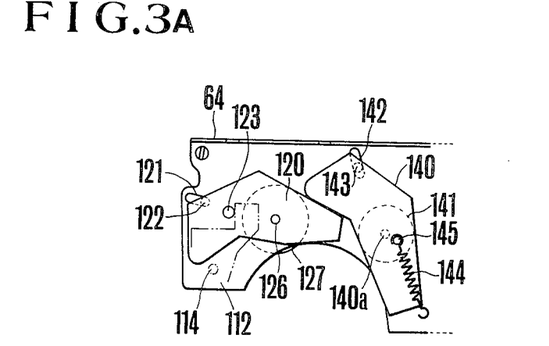
FIG. 3A is a detailed view of idler levers and associated parts.
Figure 4:
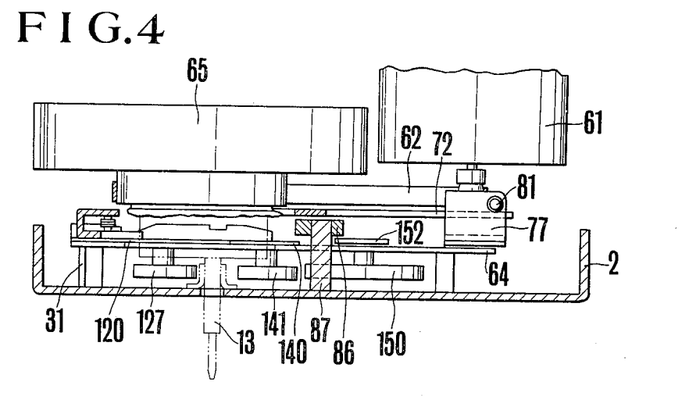
FIG. 4 is a sectional view taken along a line IV—IV shown in FIG. 3.

One end of a bent lever 110 is connected to the plunger 74 of second solenoid 71 by means of the pin 76. A pin 111 is secured to the other end of the lever 110 and received by a horizontal slot 113 at the lower end of a lever 112 of a fast forward running mechanism. The lever 112 is rotatably supported by a pin 114 secured to the rear side of the auxiliary plate 64 and normally biased to rotate in the counterclockwise direction by a spring 115. The lever 112 has an integral projection 116 at its upper right end. A bent fast forward running idler lever 120 is disposed between the auxiliary plate 64 and the lever 112. As shown in FIGS. 3, 3A and 4, the idler lever 120 is provided with a pin 122 on the left hand side which is received in a horizontal slot 121 of the auxiliary plate 64 so that the idler lever 120 can move a little in the direction of the slot 121. The idler lever 121 is pivotally mounted on pin 114 of lever 112 and normally biased toward right by a spring connected between a pin 123 secured to the rear side of the idler lever 120 and the operating pin 31. However, the idler lever 120 is held at the inoperative position by the engagement of the pin 123 and the projection 116 of lever 112, as shown in FIG. 3. At about the center of the fast running idler lever 120 is connected a shaft 126 projecting to the front surface of the auxiliary plate 64 through an opening 125 thereof for rotatably supporting an idler roller 127. When the fast running idler lever 120 is maintained at the inoperative position when the fast running lever 120 is caused to engage lever 112 by spring 115 the fast forward running idler roller 127 is separated from the take-up reel post 12 and the flywheel pulley 63, whereas when the fast forward running idler lever 120 is moved to the right by the spring 124 as a result of energization of the solenoid 70 the fast forward running idler roller 127 is pressed against the take-up reel post 12 and the flywheel pulley 63.

A leftwardly inclined take-up idler lever 130 that rotatably supports a take-up idler roller 135 is disposed above the lever 112 and beneath the auxiliary plate 64.

The take-up idler lever 130 is held to be movable in the direction of arrow B by the engagement of pin 131 at the rear end of the chassis 2 with an inclined slot 132 at about the center of the idler lever 130 and is normally biased to left lower by spring 133. Normally, however, it is held in the upper position by the engagement of the take-up idler lever 130 with the operating pin 31. At the upper position, the take-up idler roller 135 is separated from the take-up reel post 12 and the small diameter portion 66a of the intermediate pulley 66. As the head base 40 rises, and the lever 50 (see FIG. 2) is rotated in the clockwise direction, descending of the operating pin 31 stops the lower movement of the idler lever 130 thus urging it against the take-up reel post 12 and the small diameter portion 66a.

As shown in FIG. 3A, a bent pay out idler lever 140 of a pay out mechanism 109 is provided at about the center of the rear surface of the auxiliary plate 64 and the pay out or rewind idler lever 140 is provided with a pay out idler roller 141 rotatably supported by a shaft 140a projecting to the front side of the auxiliary plate 64. Similar to the fast forward running idler lever 120, the pay out idler lever 140 is held to be movable in the vertical direction by inserting a projection 143 secured to the rear surface thereof into substantially vertical slot 142 provided for the plate 64.

Although the lever 140 is biased toward lower by a spring 144, it is normally held at its upper position by the engagement of a projection 145 on the rear side of the lever 140 with a projection 146 at about the middle of the left hand side of the operating plate 72. For this reason, the pay out idler roller 141 is separated from the flywheel pulley 63 and an intermediate idler roller 150 to be described later but pressed against these members when the operating plate 72 is rotated counterclockwisely by the rotation of the operating plate 72 about its center of rotation O. The intermediate idler roller 150 is rotatably mounted on the front surface of a lever 152 which is rotatably mounted on the rear surface of the auxiliary plate 64 through a pin 151. The intermediate idler roller 150 is normally separated from the supply reel post 11 for the purpose of decreasing the load thereof, and when the pay out idler roller 141 is pressed, the intermediate idler lever 152 is rotated in the counterclockwise direction about pin 151 and urged against the supply reel post 11.

The switching operation of this mechanism will now be described with reference to FIGS. 9 through 12.

Figure 8:
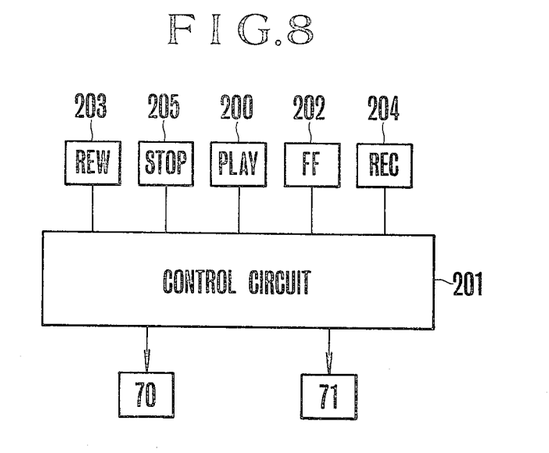
FIG. 8 is a block diagram showing the drive circuit of the pair of solenoids shown in FIG. 3.
Figure 9:
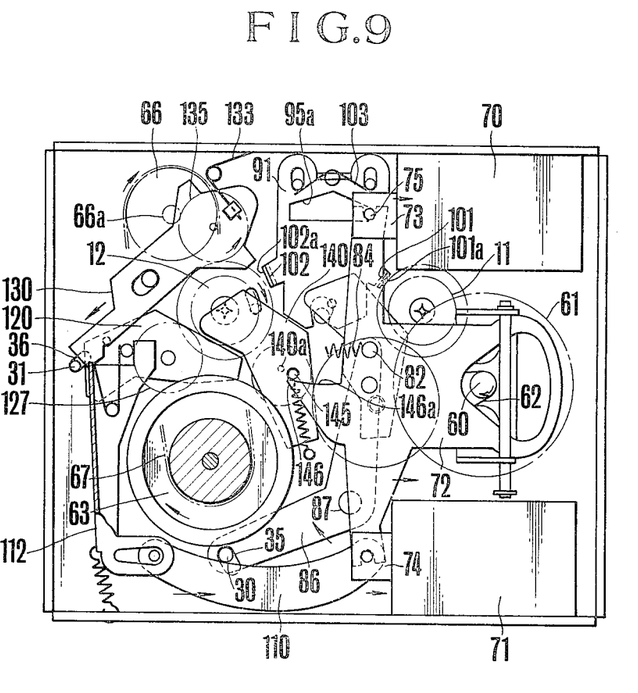
FIGS. 9 and 10 are side views useful to explain the play mode of the operating mode switching mechanism.
Figure 10:
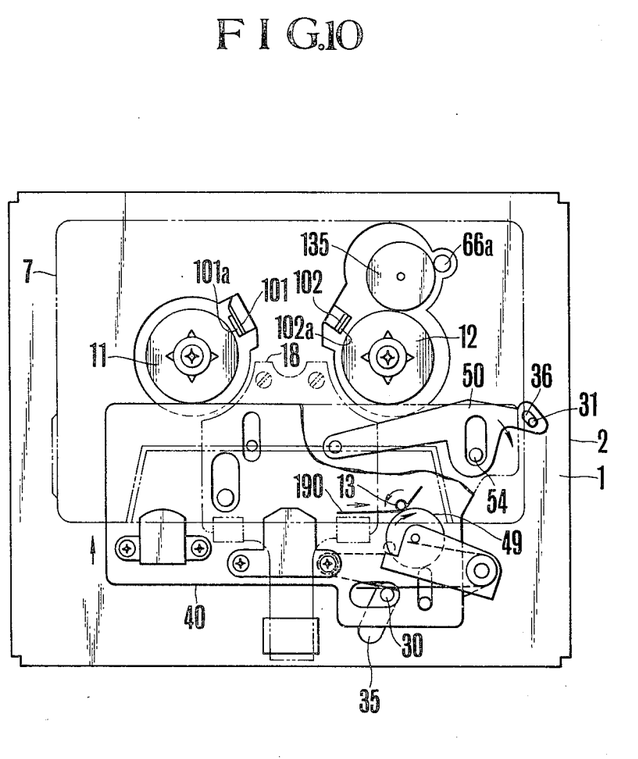

A play operation for recording and reproduction of sounds will firstly be described. In the inoperative position shown in FIGS. 2 and 3, the rotation of the driving motor 61 is transmitted to the flywheel pulley 63 via belt 62 and thence to the intermediate pulley 66 via belt 67. But this rotation is not transmitted to the supply reel post 11 and the take-up reel post 12 and the pinch roller 49 is maintained in a disengaged condition from the capstan 13. Under these conditions, when a play button (PLAY) 200 shown in FIG. 8 is depressed, a control circuit 201 is actuated to set the operation switching mechanism 1 to the play or operative position shown in FIGS. 9 and 10. More particularly, in response to the depression of the play button 200, the first and second solenoids 70 and 71 are simultaneously energized through the control circuit 201 to pull plungers 73 and 74 to the right. Accordingly, the operating plate 72 is moved to the right in the horizontal direction against the return spring 84 connected to the pin 82 of the head base operating lever 86. Rightward movement of the plunger 73 causes rightward movement of the pin 75 thereof while it is in contact with the can 95a thus raising the brake plate 91 against the force of spring 103. As a consequence, the braking pieces 101 and 102 are moved away from the supply reel post 11 and the take-up reel post 12 thus releasing braked condition.

Rightward movement of the operating lever 86 about pin 87 against the force of the return spring 84 so that the operating pin 30 secured to the lower arm of the lever 86 moves upwardly through the slot 35 of the chassis 2. Consequently, the head base 40 is raised to the play or operative position shown in FIG. 10 by the operating pin 30 through hair pin 69. Concurrently therewith, the pinch roller 49 is urged against the capstan 13 by the force of spring 57 to rotate the capstan. Thus the magnetic tape 190 payed out from the supply reel post 11 is champed between the capstan 13 and the pinch roller 49 and driven to run in the direction shown by an arrow. As the head plate 40 rises, the lever is rotated in the clockwise direction above pin 54 so that the operating pin 31 moves to the lower side of the slot 36 of the chassis 2. Consequently, the take-up idler lever 130 which has been held in the upper position by the operating pin 31 is now moved downwardly (shown by an arrow in FIG. 9) by the force of spring 133 to urge the take-up idler roller 135 against the reduced diameter portion 66a of the intermediate pulley 66. Since the rotation of this pulley 66 is reduced by the take-up idler 135 and then transmitted to the take-up reel post 12, the magnetic tape 190 is taken up thereby.

At this time, although the lever 110 is moved to the right by the energization of the second solenoid 71, since the lever 112 and the fast forward running idler lever 120 are held stationary by the projection 116, the fast forward running idler roller 127 is maintained at the inoperative position. As the operating plate 72 is moved to the right, its operating projection 146 is moved to the right while the projection 146 maintains the projection 145 of the pay out idler lever 140 in the inoperative positive and while the projection 146 slides along the surface 146a. Accordingly, the pay out idler lever 140 is still maintained in it upper position so that the rotation of the flywheel pulley 63 would not be transmitted to the supply reel post 11. As a consequence, the supply reel post 11 is maintained in the idle rotation condition thus enabling take-up of the magnetic tape 190 by the take-up reel post 12.

Figure 11:
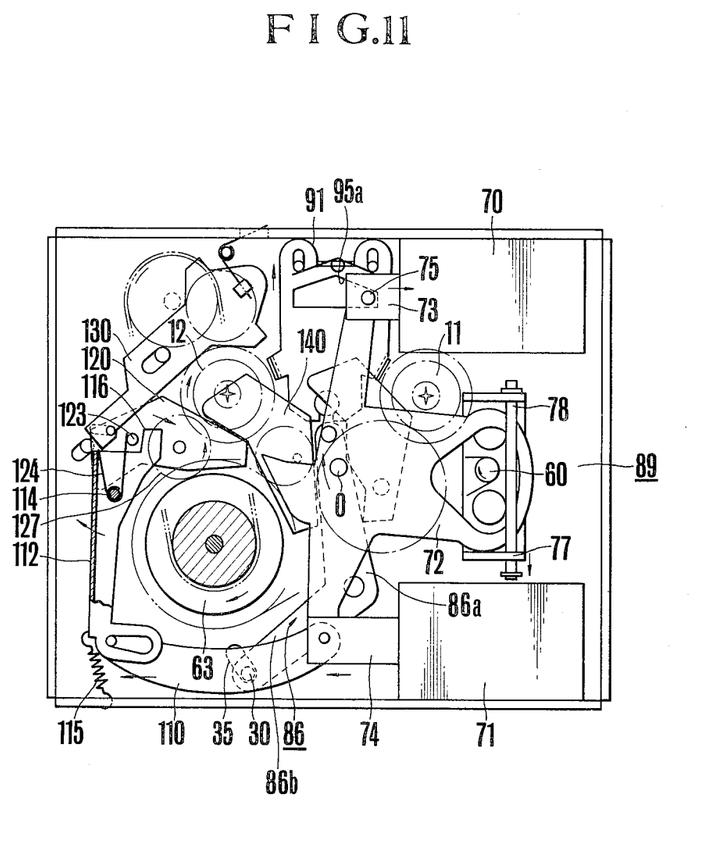
FIG. 11 is a side view useful to explain the fast forward mode of the operation switching mechanism.
Figure 12:
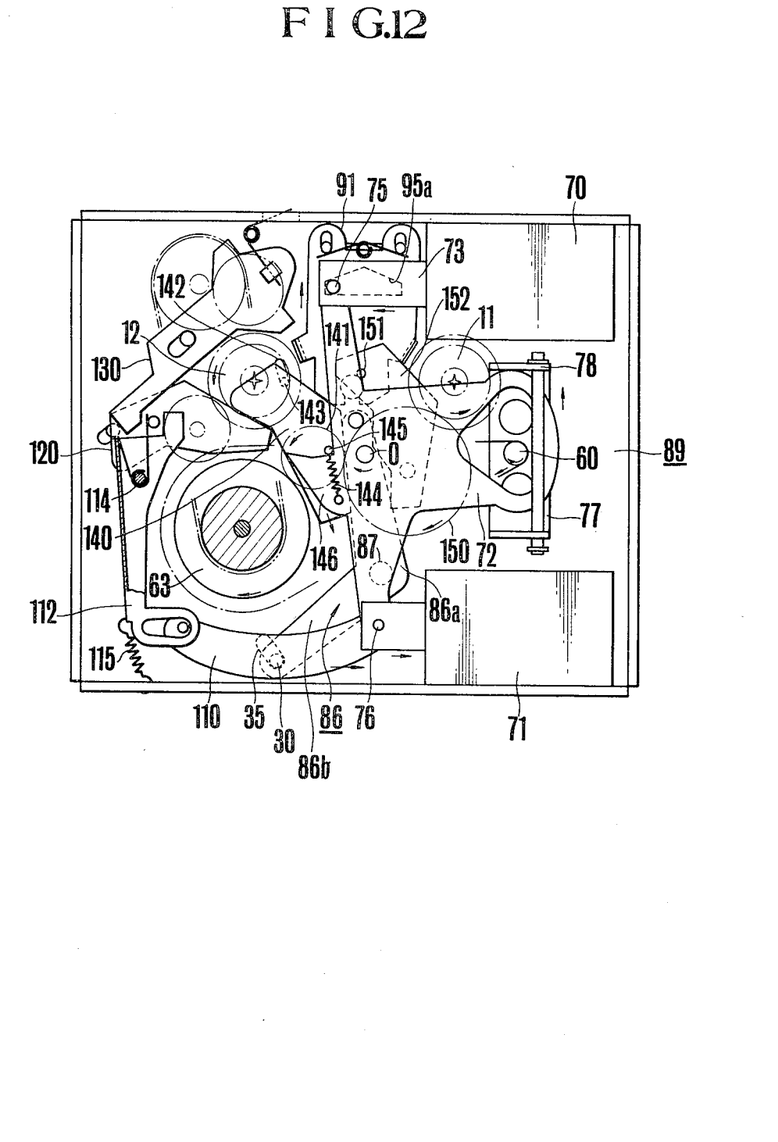
FIG. 12 is a side view useful to explain the rewinding operation of the operation switching mechanism.

A case wherein the magnetic tape 190 wrapped about the supply reel post 11 is taken up by the take-up reel post 12 by the fast forward running operation will now be described. At this time, a fast running button (FF) 202 shown in FIG. 8 is depressed to energize only the first solenoid 70 through the control circuit 201. This state is shown in FIG. 11 and the operating plate 72 is rotated in the clockwise direction about its center of rotation O. Then the pair of L shaped members 77 and 78 of the holding mechanism 89 are moved downwardly to permit the operating lever 72 to swing. As above described, since the plunger 74 of the second solenoid 71 is permitted to move in a direction opposite to that of attraction when the solenoid 71 is not energized the plunger 74 projects from the solenoid 71 as the operating plate 72 rotates. As a consequence, the bent lever 110 moves to the left thus urging the lever 112 to the left. Consequently, the lever 112 is rotated in the clockwise direction about pin 114 against the force of the spring 115 thus releasing the fast speed idler lever 120 from the projection 116. In this manner, as the projection 116 is disengaged from the pin 123 of the fast forward running idler lever 120, this lever is moved to the right by the force of spring 124 thus urging the fast forward running idler roller 127 against the take-up reel post 12 and the flywheel pulley 63. Consequently, the rotation of the flywheel pulley 63 is transmitted to the take-up reel post 12 via the fast forward running idler roller 127 to cause it to rotate in the direction shown by an arrow for taking up the magnetic tape 190 payed out from the supply reel post 11.

As above described, since the pin 75 of the brake plate 91 is moved to the right by the energization of the first solenoid 70, the brake plate 91 is moved upwardly to remove braking force from the supply reel post 11 and the take-up reel post 12.

During the fast running operation, since the operating arm 86 is held in the initial position and does not raise the head base 40, the capstan 13 is separated from the pinch roller 49 with the result that the take-up idler lever 130 is maintained at the initial position and the pay out idler lever 140 is also maintained in the initial position by the operating plate 72.

When the pay out or rewind (REW) push button 203 shown in FIG. 8 is depressed to transfer the magnetic tape 190 on the take-up reel post 12 to the supply reel post 11 only the second solenoid 71 is energized through the control circuit 201 so as to rotate the operating plate 72 in the counterclockwise direction about its center of rotation O. In this case, the pair of L shaped members 77 and 78 of the holding mechanism 88 are raised, while the plunger 73 of the solenoid 70 is projecting to the left thus permitting rotation of the operating plate 72. By the leftward movement of the plunger 73, the pin 75 pushed the cam member 95a of the brake plate 91 so that the brake plate 91 is raised to release the supply reel post 11 and the take up reel post 12. When the operating plate 72 is rotated in the counter clockwise direction, the projection 146 is lowered to disengage from the projection 145 of the idler lever 140 thereby releasing the pay out idler lever 140. Consequently, the pay out idler lever 140 is moved downwardly by the force of spring 144 to urge the pay out idler roller 141 to the intermediate idler roller 150 and the flywheel pulley 63. Then, the pressure at this time slightly rotates the intermediate idler lever 152 in the counterclockwise direction about pin 151 thus pressing the intermediate idler roller 150 to the supply reel post 11. In this manner, the rotation of the flywheel pulley 63 is transmitted to the supply reel post 11 through pay out idler roller 141 and through the intermediate idler roller 150 to take-up the magnetic tape 190 from the take-up reel post 12.

During this rewinding operation, since the operating arm 86 is maintained at the initial position similar to the fast forward running operation, the head base 40 is maintained at the inoperative position thus separating each other the capstan 13 and the pinch roller 49. Regardless of the movement of the lever 110 toward right, the lever 112, the fast forward running idler lever 120 and the take-up idler lever 130 are maintained at the initial position similar to the playing operation described above.

With the construction described above, it is possible to selectively switch the operation among three operation modes of play, fast forward running and rewind with only two solenoids and a single operating plate.

In addition to the buttons described above, the operation buttons of the tape recorder further include a recording button (REC) 204 and a stop button (STOP) 205 as shown in FIG. 8. The recording button 204 is used to switch a circuit, not shown, for recording sounds in a play state, whereas the stop button 205 is used to deenergize the solenoids 70 and 71.

Although in the foregoing embodiment, the fast running idler roller and the play back idler roller were constructed independently, these two idler rollers may be combined into a single roller, in which case the lever 112, and the fast running idler lever 120 may be omitted. Retracting type solenoids were used in the embodiment. However extruding type solenoids which extrude plungers when energized may be used if the control circuit is suitably modified. Furthermore, above description was made in connection with a cassette type tape recorder it should be understood that the invention is also applicable any type of magnetic recording and reproducing apparatus.

As above described, according to this invention, there is provided an operation switching mechanism for a tape recorder wherein two solenoids and a single operating motor are provided and by energizing the two solenoids concurrently or selectively, an operating plate is moved or rotated to selectively operate a play mechanism, a fast forward running mechanism, a pay out or rewinding mechanism and a brake mechanism which are interlocked with the operating plate. Accordingly, it is possible to smoothly and positively switch the operation among these mechanisms. Moreover, as the construction of the operating plate is simple, it can be readily assembled and adjusted.

What is claimed is:

1. In an operating mechanism of a tape recorder of the type wherein according to play, fast forward running and rewinding modes, the operation of a motion transmitting mechanism including a first idler roller, a second idler roller and a third idler roller is switched by an operating plate operatively connected with plungers of a first and a second solenoid so as to selectively transmit driving torque of a driving motor to a take-up reel post and to a supply reel post through said motion transmitting mechanism, the improvement which comprises means to rotate said operating plate about a center of rotation thereof according to the movement of the plunger of an energized one of said solenoid, means to linearly move said operating plate in accordance with the movements of the plungers of said solenoids when they are energized simultaneously; a head mechanism for moving a magnetic head to a play position during the play mode whereas for moving the head away from the play position during another modes; a connecting member connected between said head mechanism and said center of rotation; spring means provided for said connecting member for normally urging said head away from said play position; a brake mechanism operatively connected to the plunger of said first solenoid; and means for operating said brake mechanism to apply a braking force to said take-up reel post and to said supply reel post when neither of said solenoids is not energized and to release said take-up and supply reel posts when at least one of said solenoids is energized.

2. An operating mechanism according to claim 1 wherein said operating plate comprises an idler operating projection which operates to maintain said second idler at a neutral position, and to apply the driving torque to one of said reel posts through said second idler roller, when one of said solenoids is energized.

3. An operating mechanism according to claim 1 which further comprises a member which is operatively connected to said first idler roller and rotatably connected to the plunger of said second solenoid so that the driving torque is transmitted to said take-up reel post through said first idler roller when one of said solenoids is energized whereas the first idler roller is maintained at a neutral position in another operating modes.

4. An operating mechanism according to claim 1 which further comprises holding means which permits said operating plate to move either linearly or rotatively.

5. An operating mechanism according to claim 1 wherein said take-up reel post and said supply reel post are disposed on the opposite sides of said operating plate operatively connected to the plungers of the respective solenoids.

6. An operating mechanism according to claim 1 wherein said brake mechanism comprises a cam for cooperating with a pin provided on the plunger of said first solenoid.

7. An operating mechanism according to claim 6 wherein said cam is shaped such that the braking mechanism is urged to apply the brake force to said reel posts when said plunger is in a neutral position and to release said reel posts when said plunger is out of the neutral position.

8. An operating mechanism according to claim 7 wherein said brake plate is provided with a pair of slots which receive stationary guide pins respectively.

9. An operating mechanism according to claim 8 wherein said braking plate is urged to apply said braking force by a spring with opposite ends engaged with notches provided for said guide pins.

10. An operating mechanism according to claim 1 which further comprises a member operatively coupled to said operating plate and to said third ider roller so that the driving torque is transmitted to said take-up reel post through said third ider roller when both of said solenoids are energized.

* * * * *